(12) United States Patent
Hooli et al.

(10) Patent No.: US 9,503,168 B2
(45) Date of Patent: Nov. 22, 2016

(54) METHOD AND APPARATUS FOR CODEBOOK-BASED PRECODING IN MIMO SYSTEMS

(71) Applicant: Nokia Solutions and Networks Oy, Espoo (FI)

(72) Inventors: Kari Juhani Hooli, Oulu (FI); Kari Pekka Pajukoski, Oulu (FI); Esa Tapani Tiirola, Kempele (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 14/640,261

(22) Filed: Mar. 6, 2015

(65) Prior Publication Data

US 2015/0180556 A1    Jun. 25, 2015

Related U.S. Application Data

(63) Continuation of application No. 13/256,659, filed as application No. PCT/EP2009/053162 on Mar. 17, 2009.

(51) Int. Cl.
*H04L 25/03* (2006.01)
*H04B 7/04* (2006.01)
*H04B 7/06* (2006.01)

(52) U.S. Cl.
CPC ............ *H04B 7/046* (2013.01); *H04B 7/0417* (2013.01); *H04B 7/0469* (2013.01); *H04B 7/0486* (2013.01); *H04B 7/0619* (2013.01); *H04B 7/0639* (2013.01); *H04B 7/0691* (2013.01)

(58) Field of Classification Search
CPC .................. H04L 25/03891; H04L 25/03898; H04L 25/03949

USPC .......................... 375/295, 296, 299, 260, 267
See application file for complete search history.

(56) References Cited

U.S. PATENT DOCUMENTS

2008/0080634 A1    4/2008  Kotecha et al.
2008/0292013 A1    11/2008  Varadarajan et al.
(Continued)

FOREIGN PATENT DOCUMENTS

CA    2731210 A1    2/2010
RU    2341021 C2    12/2008
(Continued)

OTHER PUBLICATIONS

TR 36.913 V8.0.0 (Jun. 2008), Requirements for further advancements for Evolved Universal Terrestrial Radio Access (E-UTRA) (LTE-Advanced) 3rd Generation Partnership Project; Technical Specification Group Radio Access Network; Requirements for Further Advancements for E-UTRA (LTE-Advanced), (Release 8), (14 pages).
(Continued)

*Primary Examiner* — Daniel Washburn
*Assistant Examiner* — Fitwi Hailegiorgis
(74) *Attorney, Agent, or Firm* — Harrington & Smith

(57) ABSTRACT

A method including using a precoding code book for controlling transmissions from four antennas of a device, said code book including a plurality of entries, wherein said entries are such that a single layer is mapped to each selected antenna, said code book entries including different antenna pair combinations whereby one or two antenna pairs are selected for transmission.

41 Claims, 6 Drawing Sheets

(56) References Cited

U.S. PATENT DOCUMENTS

| 2008/0303699 | A1 | 12/2008 | Zhang et al. | 341/67 |
| 2009/0225737 | A1 | 9/2009 | Kim et al. | 370/342 |
| 2010/0027697 | A1 | 2/2010 | Malladi et al. | 375/260 |
| 2010/0039928 | A1 | 2/2010 | Noh et al. | |
| 2012/0002750 | A1* | 1/2012 | Hooli et al. | 375/295 |

FOREIGN PATENT DOCUMENTS

| WO | WO-2008/085107 | A2 | 7/2008 |
| WO | WO-2008/086239 | A1 | 7/2008 |
| WO | WO-2008/100213 | A2 | 8/2008 |
| WO | WO-2008/133582 | A2 | 11/2008 |

OTHER PUBLICATIONS

R1-090915, 3GPP TSG-RAN WG1 #56 Athens, Greece, Feb. 9-Feb. 13, 2009, Ericsson, "Uplink SU-MIMO in LTE-Advanced" Feb. 4, 2009 XP 002558254, (10 pages).

R1-090590, 3GPP TSG RAN WG1 56 Athens, Greece, Feb. 12-16, 2009, Texas Instruments, Codebook Design for Uplink SU-MIMO, (12 pages).

R1-062355, 3GPP TSG RAN WG1 Meeting #46 Tallinn, Estonia, Aug. 28-Sep. 1, 2006, Nokia, Linear Precoding for single stream transmission from 2TX antennas, (6 pages).

Hottinen A. Et al. "Industrial Embrace of Smart Antennas and MIMO" IEEE Wireless Communications, IEEE Services Center Piscatyway, NJ, US, vol. 13 No. 4 Aug. 1, 2006 pp. 8-16 XP 001540761 ISSN: 1536-1284.

3 GPP TS 36.211 V8.6.0 Evolved Universal Terrestrial Radio Access (E-UTRA) Physical layer procedures (Release 8) (Mar. 1, 2009) pp. 1-83 XP002558269.

3GPP TS 36.213 V8.6.0; Evolved Universal Terrestrial Radio Access (E-UTRA); Physical layer procedures (Release 8) (Mar. 2009) pp. 1-77 XP002558263.

Nokia et al; "Precoding codebook performance comparison for 4x2 LTE DL SU-MIMO"; R1-072979; 3GPP TSG RAN WG1 Meeting #49-Bis; Jun. 25-29, 2007; Orlando, Florida, USA; whole document (18 pages).

\* cited by examiner

Table 1

| PMI | Ant1 | Ant2 | Ant3 | Ant4 |
|---|---|---|---|---|
| 1 | 0.5 | 0.5 | 0.5 | 0.5 |
| 2 | 0.5 | 0.5 | 0.5j | 0.5j |
| 3 | 0.5 | 0.5 | -0.5 | -0.5 |
| 4 | 0.5 | 0.5 | -0.5j | -0.5j |
| 5 | 0.5 | 0.5j | 0.5 | 0.5j |
| 6 | 0.5 | -0.5 | 0.5 | -0.5 |
| 7 | 0.5 | -0.5j | 0.5 | -0.5j |
| 8 | 0.5 | 0.5j | 0.5j | 0.5 |
| 9 | 0.5 | -0.5 | -0.5 | 0.5 |
| 10 | 0.5 | -0.5j | -0.5j | 0.5 |
| 11 | STBC | STBC | 0 | 0 |
| 12 | STBC | 0 | STBC | 0 |
| 13 | STBC | 0 | 0 | STBC |
| 14 | 0 | STBC | STBC | 0 |
| 15 | 0 | STBC | 0 | STBC |
| 16 | 0 | 0 | STBC | STBC |

Table 2

| PMI | Ant1 | Ant2 | Ant3 | Ant4 |
|---|---|---|---|---|
| 1 | 0.5 | 0.5 | 0.5 | 0.5 |
| 2 | 0.5 | 0.5 | 0.5j | 0.5j |
| 3 | 0.5 | 0.5 | -0.5 | -0.5 |
| 4 | 0.5 | 0.5 | -0.5j | -0.5j |
| 5 | 0.5 | 0.5j | 0.5 | 0.5j |
| 6 | 0.5 | -0.5 | 0.5 | -0.5 |
| 7 | 0.5 | -0.5j | 0.5 | -0.5j |
| 8 | 0.5 | 0.5j | 0.5j | 0.5 |
| 9 | 0.5 | -0.5 | -0.5 | 0.5 |
| 10 | 0.5 | -0.5j | -0.5j | 0.5 |
| 11 | 0.71 | 0.71 | 0 | 0 |
| 12 | 0.71 | -0.71 | 0 | 0 |
| 13 | 0.71 | 0 | 0.71 | 0 |
| 14 | 0.71 | 0 | -0.71 | 0 |
| 15 | 0.71 | 0 | 0 | 0.71 |
| 16 | 0.71 | 0 | 0 | -0.71 |
| 17 | 0 | 0.71 | 0.71 | 0 |
| 18 | 0 | 0.71 | -0.71 | 0 |
| 19 | 0 | 0.71 | 0 | 0.71 |
| 20 | 0 | 0.71 | 0 | -0.71 |
| 21 | 0 | 0 | 0.71 | 0.71 |
| 22 | 0 | 0 | 0.71 | -0.71 |

FIG. 2

Table 3

| PMI | Ant1 | Ant2 | Ant3 | Ant4 |
|---|---|---|---|---|
| 1 | 0.5 | 0.5 | 0.5 | 0.5 |
| 2 | 0.5 | 0.5 | 0.5 j | 0.5 j |
| 3 | 0.5 | 0.5 | -0.5 | -0.5 |
| 4 | 0.5 | 0.5 | -0.5 j | -0.5 j |
| 5 | 0.5 | 0.5 j | 0.5 | 0.5 j |
| 6 | 0.5 | -0.5 | 0.5 | -0.5 |
| 7 | 0.5 | -0.5 j | 0.5 | -0.5 j |
| 8 | 0.5 | 0.5 j | 0.5 j | 0.5 |
| 9 | 0.5 | -0.5 | -0.5 | 0.5 |
| 10 | 0.5 | -0.5 j | -0.5 j | 0.5 |
| 11 | 0.71 | 0.71 | 0 | 0 |
| 12 | 0.71 | -0.35-0.61 j | 0 | 0 |
| 13 | 0.71 | -0.35+0.61 j | 0 | 0 |
| 14 | 0 | 0 | 0.71 | 0.71 |
| 15 | 0 | 0 | 0.71 | -0.35-0.61 j |
| 16 | 0 | 0 | 0.71 | -0.35+0.61 j |

FIG. 2 (CONT'D)

Table 1

| PMI | Ant | Layer 1 | Layer 2 |
|---|---|---|---|
| 1 | 1 | 0.5 | |
| | 2 | 0.5 | |
| | 3 | | 0.5 |
| | 4 | | 0.5 |
| 2 | 1 | 0.5 | |
| | 2 | -0.5 | |
| | 3 | | 0.5 |
| | 4 | | 0.5 |
| 3 | 1 | 0.5 | |
| | 2 | 0.5 | |
| | 3 | | 0.5 |
| | 4 | | -0.5 |
| 4 | 1 | 0.5 | |
| | 2 | -0.5 | |
| | 3 | | 0.5 |
| | 4 | | -0.5 |
| 5 | 1 | 0.5 | |
| | 2 | | 0.5 |
| | 3 | 0.5 | |
| | 4 | | 0.5 |
| 6 | 1 | 0.5 | |
| | 2 | | 0.5 |
| | 3 | -0.5 | |
| | 4 | | 0.5 |
| 7 | 1 | 0.5 | |
| | 2 | | 0.5 |
| | 3 | 0.5 | |
| | 4 | | -0.5 |
| 8 | 1 | 0.5 | |
| | 2 | | 0.5 |
| | 3 | -0.5 | |
| | 4 | | -0.5 |
| 9 | 1 | 0.5 | |
| | 2 | | 0.5 |
| | 3 | | 0.5 |
| | 4 | 0.5 | |
| 10 | 1 | 0.5 | |
| | 2 | | 0.5 |
| | 3 | | 0.5 |
| | 4 | -0.5 | |
| 11 | 1 | 0.5 | |
| | 2 | | 0.5 |
| | 3 | | -0.5 |
| | 4 | 0.5 | |
| 12 | 1 | 0.5 | |
| | 2 | | 0.5 |
| | 3 | | -0.5 |
| | 4 | -0.5 | |

Table 2

| PMI | Ant | Layer 1 | Layer 2 |
|---|---|---|---|
| 1 | 1 | STBC | |
| | 2 | STBC | |
| | 3 | | STBC |
| | 4 | | STBC |
| 2 | 1 | STBC | |
| | 2 | | STBC |
| | 3 | STBC | |
| | 4 | | STBC |
| 3 | 1 | STBC | |
| | 2 | | STBC |
| | 3 | | STBC |
| | 4 | STBC | |

FIG. 3

Table 1

| PMI | Ant | Layer 1 | Layer 2 | Layer 3 |
|---|---|---|---|---|
| 1 | 1 | 0.5 | | |
|   | 2 | 0.5 | | |
|   | 3 | | 0.5 | |
|   | 4 | | | 0.5 |
| 2 | 1 | 0.5 | | |
|   | 2 | -0.5 | | |
|   | 3 | | 0.5 | |
|   | 4 | | | 0.5 |
| 3 | 1 | 0.5 | | |
|   | 2 | | 0.5 | |
|   | 3 | 0.5 | | |
|   | 4 | | | 0.5 |
| 4 | 1 | 0.5 | | |
|   | 2 | | 0.5 | |
|   | 3 | -0.5 | | |
|   | 4 | | | 0.5 |
| 5 | 1 | 0.5 | | |
|   | 2 | | 0.5 | |
|   | 3 | | | 0.5 |
|   | 4 | 0.5 | | |
| 6 | 1 | 0.5 | | |
|   | 2 | | 0.5 | |
|   | 3 | | | 0.5 |
|   | 4 | -0.5 | | |
| 7 | 1 | | 0.5 | |
|   | 2 | 0.5 | | |
|   | 3 | 0.5 | | |
|   | 4 | | | 0.5 |
| 8 | 1 | | 0.5 | |
|   | 2 | 0.5 | | |
|   | 3 | -0.5 | | |
|   | 4 | | | 0.5 |
| 9 | 1 | | 0.5 | |
|   | 2 | 0.5 | | |
|   | 3 | | | 0.5 |
|   | 4 | 0.5 | | |
| 10 | 1 | | 0.5 | |
|    | 2 | 0.5 | | |
|    | 3 | | | 0.5 |
|    | 4 | -0.5 | | |
| 11 | 1 | | 0.5 | |
|    | 2 | | | 0.5 |
|    | 3 | 0.5 | | |
|    | 4 | 0.5 | | |
| 12 | 1 | | 0.5 | |
|    | 2 | | | 0.5 |
|    | 3 | 0.5 | | |
|    | 4 | -0.5 | | |

Table 2

| PMI | Ant | Layer 1 | Layer 2 | Layer 3 |
|---|---|---|---|---|
| 1 | 1 | STBC | | |
|   | 2 | STBC | | |
|   | 3 | | 0.5 | |
|   | 4 | | | 0.5 |
| 2 | 1 | STBC | | |
|   | 2 | | 0.5 | |
|   | 3 | STBC | | |
|   | 4 | | | 0.5 |
| 3 | 1 | STBC | | |
|   | 2 | | 0.5 | |
|   | 3 | | | 0.5 |
|   | 4 | STBC | | |
| 4 | 1 | | 0.5 | |
|   | 2 | STBC | | |
|   | 3 | STBC | | |
|   | 4 | | | 0.5 |
| 5 | 1 | | 0.5 | |
|   | 2 | STBC | | |
|   | 3 | | | 0.5 |
|   | 4 | STBC | | |
| 6 | 1 | | 0.5 | |
|   | 2 | | | 0.5 |
|   | 3 | STBC | | |
|   | 4 | STBC | | |

FIG. 4

METHOD AND APPARATUS FOR CODEBOOK-BASED PRECODING IN MIMO SYSTEMS

CROSS-REFERENCE TO A RELATED PATENT APPLICATION

This is a continuation of U.S. patent application Ser. No. 13/256,659 filed Sep. 15, 2011, which is a National Stage Application of PCT Application No. PCT/EP2009/053162, filed on Mar. 17, 2009, the disclosure of which are incorporated by reference herein in their entirety.

FIELD OF THE INVENTION

Embodiments of the present invention relate to a method and apparatus and, in particular but not exclusively, to apparatus and a method for use in a multiple input multiple output wireless telecommunications network.

BACKGROUND

It has been proposed to improve the coverage and capacity of communication by use of spatial diversity or spatial multiplexing. By using spatial multiplexing, the data rate can be increased by transmitting independent information streams from different antennas but using the same channel as defined by frequency and time resource and possibly spreading code.

These systems may be referred to as multiple input multiple output (MIMO) systems. These systems require complex controllers to control both the transmission and receiving elements of the mobile station and the base station.

Multi-stream single user MIMO transmission has been proposed and forms part of WCDMA (wideband code division multiple access), 3GPP LTE (Third generation partnership project-long term evolution) and WiMax system standards. In single user multiple input multiple output (SU-MIMO), a MIMO receiver with multiple antennas and receiving circuitry receives the multiple streams, separates the multiple streams and determines the transmission symbols sent over each stream of the spatially multiplexed data streams.

In the 3GPP forum, LTE-Advanced has been proposed to be an evolution of LTE Rel'8 system to address the ITU-R (international Telecommunications Union Radio communication Sector) requirements for IMT (International Mobile Telecommunications)-Advanced. 3GPP approved a new Study Item on LTE-Advanced in RAN#39 (March 2008). It has been proposed that SU-MIMO with 2-4 transmission antennas at the UE (user equipment) will be part of LTE-Advanced [TR 36.913 v8.0.0].

It has been proposed that SU-MIMO UL (uplink) transmissions will involve transmission precoding techniques and that this precoding utilizes fixed codebooks.

In a submission made to 3GPP in R1-090915, Ericsson has proposed a 4Tx (transmission) precoding codebook that attempts to preserve a favourable PAPR (peak to average power ratio) property of the transmitted signal. However, the inventors have identified that this proposal is limited to rank 2 transmissions.

In the R1-090590 submission to 3GPP, Texas instruments noted that large codebook sets at full transmission rank do not provide significant gain.

Antenna imbalance has been considered in the codebook design, proposed in R1-062355 to 3GPP by Nokia. However, the inventors have identified that these designs have focused on 2 Tx schemes.

The Householder codebook used in LTE Rel'8 DL (downlink) increases PAPR but the inventors have identified that this scheme does not take the potential transmit antenna imbalance (e.g. due to movement of the user equipment in a user's hand) into account.

SUMMARY

According to one aspect of the present invention, there is provided a method comprising using a precoding code book for controlling transmissions from four antennas of a device, said code book comprising a plurality of entries, wherein said entries are such that a single layer is mapped to each selected antenna, said code book entries comprising different antenna pair combinations whereby one or two antenna pairs are selected for transmission.

According to another aspect of the present invention, there is provided an apparatus comprising a processor configured to use a precoding code book for controlling transmissions from four antennas of a device, said code book comprising a plurality of entries, wherein said entries are such that a single layer is mapped to each selected antenna, said code book entries comprising different antenna pair combinations whereby one or two antenna pairs are selected for transmission.

According to a further aspect of the present invention, there is provided an apparatus comprising a processor configured to select one of a plurality of entries in a preceding code book for controlling transmissions from four antennas of a device, wherein said entries are such that a single layer is mapped to each selected antenna, said code book entries comprising different antenna pair combinations whereby one or two antenna pairs are configured to be selected for transmission.

BRIEF DESCRIPTION OF THE DRAWINGS

Various embodiments of the present invention will now described by way of example only with reference to the accompanying Figures, in which:

FIG. 2 shows a codebook embodying the present invention—rank 1;

FIG. 3 shows a codebook embodying the present invention—rank 2;

FIG. 4 shows a codebook embodying the present invention—rank 3;

DESCRIPTION OF EXEMPLARY EMBODIMENTS

Embodiments of the present invention are described herein by way of particular examples and specifically with reference to preferred embodiments. It will be understood by one skilled in the art that the invention may not be limited to the details of the specific embodiments given herein.

Figure 1:
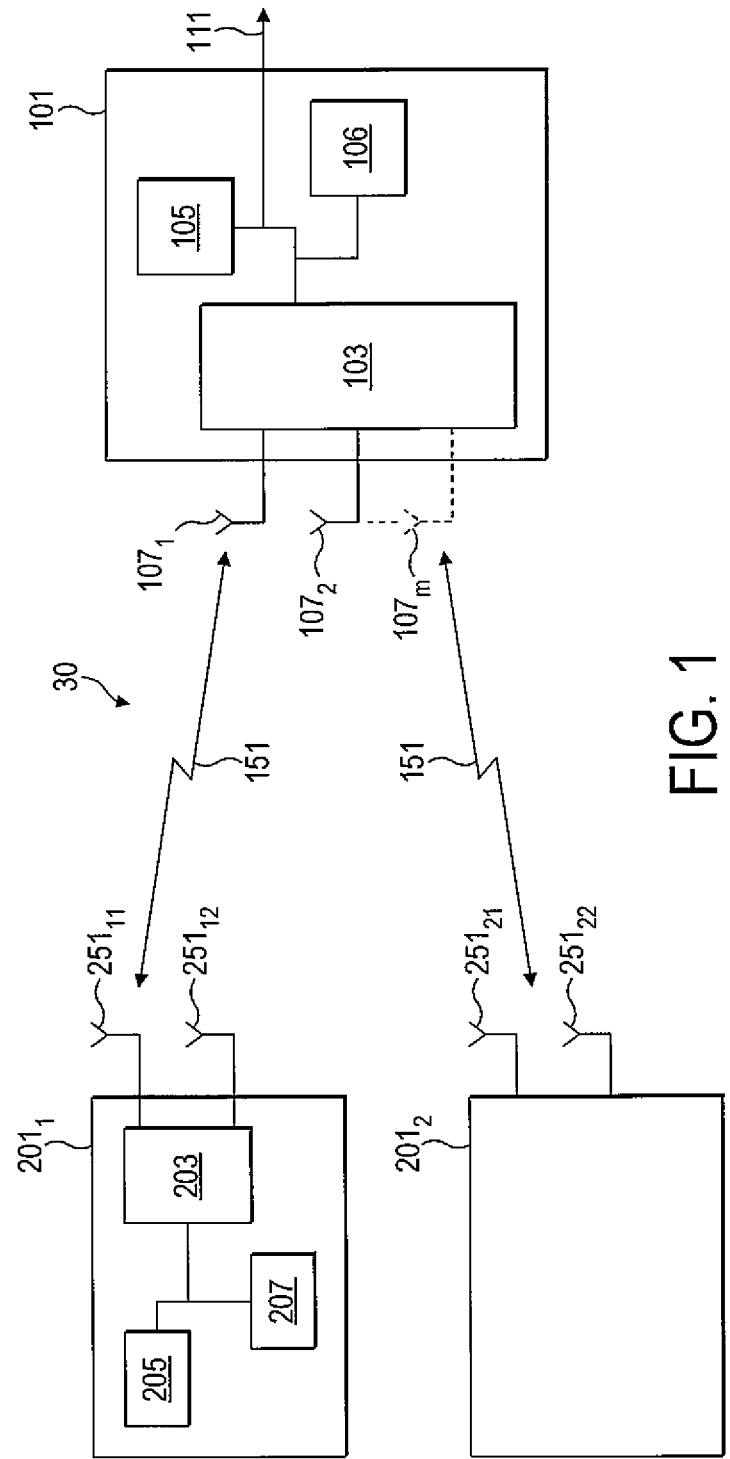
FIG. 1 shows a schematic view of a system including an schematic base station and user equipment configuration within which embodiments of the invention may be implemented.

FIG. 1 shows a communication network 30 in which some embodiments of the present invention may be implemented. In particular, some embodiments of the present invention may relate to the implementation of radio modulators/demodulators (modems) for a range of devices that may include: user equipment 201, relays, access points or base stations 101 which communicate over a wireless environment 151.

Embodiments of the present invention may be applicable to communication networks implemented according to a range of standards and their evolution including: WCDMA (Wideband Code Division Multiple Access), 3GPP LTE (Long Term Evolution), WiMax (Worldwide Interoperability for Microwave Access), UMB (Ultra Mobile Broadband), CDMA (Code Division Multiple Access), 1×EV-DO (Evolution-Data Optimized), WLAN (Wireless Local Area Network), and UWB (Ultra-Wide Band) receivers.

With respect to FIG. 1, a schematic view of a system within which embodiments of the invention may be implemented is shown. The communication system 30 is shown with a base station 101 which may be a node B (NB), an enhanced node B (eNB) or any access server suitable for enabling user equipment 201 to access wirelessly a communication system.

FIG. 1 shows a system whereby the base station (BS) 101 may transmit to the user equipment (UE) 201 via the wireless environment communications channel 151, which may be known as the downlink (DL), and the user equipment (UE) 201 may transmit to the base station (BS) 101 via the wireless environment communications channel 151, which may be known as the uplink (UL).

The base station 101 can comprise a processor 105 which may be configured to control the operation of the receiver/transmitter circuitry 103. The processor may be configured to run software stored in memory 106.

The memory 106 may be further configured to store data and/or information to be transmitted and/or received. The memory 106 may further be used to store configuration parameters used by the processor 105 in operating the base station 101.

The transmitter/receiver circuitry 103 may be configured to operate as a configurable transmitter and/or receiver converting between radio frequency signals of a specific protocol for transmission over (or reception via) the wireless environment and baseband digital signals. The transmitter/receiver circuitry 103 may be configured to use the memory 106 as a buffer for data and/or information to be transmitted over or received from the wireless environment 151.

The transmitter/receiver circuitry 103 may further be configured to be connected to at least one antenna for receiving and transmitting the radio frequency signals over the wireless environment to the user equipment 201. In FIG. 1 the base station is shown comprising 2 antennas, the first antenna $107_1$ and the second antenna $107_2$ both configured to transmit and receive signals. In other embodiments of the invention the base station may have more antennas represented by the dotted antenna $107_m$ in FIG. 1. In one preferred embodiment, m may be 4. Four receiving antennas is needed in order to support rank-4 transmission.

The base station 101 may be connected to other network elements via a communications link 111. The communications link 111 may receive data to be transmitted to the user equipment 201 via the downlink and transmits data received from the user equipment 201 via the uplink. This data may comprise data for all of the user equipment within the cell or wireless communications range operated by the base station 101. The communications link 111 is shown in FIG. 1 as a wired link. However it would be understood that the communications link may further be a wireless communications link.

In FIG. 1, there is shown two user equipment 201 within the range of the base station 101. However it would be understood that there may be more or fewer user equipment 201 within range of the base station 101. The user equipment may be a mobile station, or any other apparatus or electronic device suitable for communication with the base station. For example in further embodiments of the invention the user equipment may be personal data organisers or laptop computers suitable for wireless communication in the environment as described hereafter. It should be appreciated that embodiments of the invention may also be applied to a relay station.

FIG. 1 in particular shows a first user equipment $UE_1$ $201_1$ and a second user equipment $UE_2$ $201_2$. Furthermore FIG. 1 shows in more detail the first user equipment $UE_1$ $201_1$. The first user equipment $201_1$ may comprise a processor 205 configured to control the operation of a receiver/transmitter circuitry 203. The processor may be configured to run software stored in memory 207. The processor may further control and operate any operation required to be carried out by the user equipment such as operation of the user equipment display, audio and/or video encoding and decoding in order to reduce spectrum usage, etc.

The memory 207 may be further configured to store data and/or information to be transmitted and/or received. The memory 207 may further be used to store configuration parameters used by the processor 205 in operating the user equipment $201_1$. The memory may be solid state memory, optical memory (such as, for example, CD or DVD format data discs), magnetic memory (such as floppy or hard drives), or any media suitable for storing the programs for operating the processors, configuration data or transmission/reception data.

The transmitter/receiver circuitry 203 may be configured to operate as a configurable transmitter and/or receiver converting between radio frequency signals of a specific protocol for transmission over (or reception via) the wireless environment and baseband digital signals. The transmitter/receiver circuitry 203 may be configured to use the memory 207 as a buffer for data to be transmitted over or received from the wireless environment 151.

The transmitter/receiver circuitry 203 is configured to be connected to at least one antenna for receiving and transmitting the radio frequency signals over the wireless environment to the base station 101. In FIG. 1 the user equipment is shown comprising 4 antennas, the first antenna $251_{11}$ to the fourth antenna $251_{14}$.

Although FIG. 1 and the examples described hereafter describe the user equipment and the bases station as having a processor arranged to carry out the operations described below, it would be understood that in embodiments of the invention the respective processors may comprise a single processor or a plurality of processors. The processors may be implemented by one or more integrated circuits.

Some embodiments of the present invention maybe used in the LTE-Advanced system which may be part of 3GPP LTE Rel. 10. However, it should be appreciated protocol for transmission over (or reception via) the wireless environment and baseband digital signals. The transmitter/receiver circuitry 203 may be configured to use the memory 207 as a buffer for data to be transmitted over or received from the wireless environment 151.

The transmitter/receiver circuitry 203 is configured to be connected to at least one antenna for receiving and transmitting the radio frequency signals over the wireless environment to the base station 101. In FIG. 1 the user equipment is shown comprising 4 antennas, the first antenna $251_{11}$ to the fourth antenna $251_{14}$.

Although FIG. 1 and the examples described hereafter describe the user equipment and the bases station as having a processor arranged to carry out the operations described below, it would be understood that in embodiments of the invention the respective processors may comprise a single processor or a plurality of processors. The processors may be implemented by one or more integrated circuits.

Some embodiments of the present invention may be used in the LTE-Advanced system which may be part of 3GPP LTE Rel. 10. However, it should be appreciated that this is by way of example only and embodiments of the invention may be used in alternative systems.

A PUSCH (physical uplink shared channel) preceding scheme for single user MIMO (SU-MIMO), with a precoding codebook design for 4 Tx (Transmission) antennas is discussed. In another embodiment, these techniques could be applied also to PUCCH Format 2 (for example with single stream precoding). The same techniques may be applied to sounding reference signals.

In some embodiments of the invention, the SU-MIMO preceding codebooks are arranged to take into account the properties specific for the uplink of LTE-Advanced system. Some embodiments are arranged to take into account:
  Imbalance between Tx antennas in the UE due to for example the grip of the hand and changing of the antenna orientation, which provide different responses to the vertical and horizontal polarization components.
  Power efficiency decrement due to increased PAPR In a MIMO system, the performance of a radio system is improved by using spatial precoding at a transmitter and spatial postcoding at the receiver. Spatial precoding may comprise spatial beamforming and spatial coding. The spatial precoding is done to enhance the signal power at the destination and to diminish the interfering power.

In single-layer beamforming, the same signal is emitted from each of the transmit antennas with appropriate phase (and optionally gain) weighting such that the signal power is maximized at the receiver input. The benefits of beamforming are to increase the signal gain from constructive combining and to reduce the multipath fading effect. When the receiver has multiple antennas, the transmit beamforming cannot simultaneously maximize the signal level at all of the receive antenna and precoding is used. Precoding requires knowledge of the channel state information (CSI) at the transmitter.

Some embodiments of the invention use a precoding codebook design for simultaneous transmission of up to 2 codewords. In this embodiment, the codeword can be regarded as a transport block which contains data that is encoded with e.g. turbo code. In the following, the terminology transport block will be used. The transport blocks are transmitted from 4 transmit antennas. In some embodiments of the invention, the preceding codebook is designed based on one or more of the following criteria:
  Precoding contains preceding matrices that preserve the PAPR of SC-FDMA (single carrier frequency division multiple access) transmission. Thus, only one layer is mapped for each antenna.
  Precoding takes potential transmit antenna imbalance into account by one or more of:
    Containing antenna or polarization selection in the codebook for rank 1 transmission
    Ensuring that each transport block is transmitted from a plurality of antennas that can be selected according to the current channel state, when transmission rank is less than number of transmit antennas.
    Containing Tx diversity elements with antenna selection or antenna grouping in the codebook in order to minimize the size of codebook Based on the criteria, a codebook for a specific rank is designed with following steps:
  For a single-stream transmission:
  transmit antennas are grouped into two groups, with 2 antennas per group.
  After that, all possible antenna-to-antenna group mappings are listed
  Different phase rotation combinations between the antennas within the antenna group are listed as codebook entries.
  Additionally, selection of single antenna group for transmission is included into the codebook. Different antenna-to-antenna group options are included, and either phase rotation or a transmission Tx diversity method is applied between the antennas within the antenna group.
  For a multi-stream transmission
  Number of transmit antennas per layer is selected so that each transport block is transmitted from multiple antennas
  After that, all possible layer-to-antenna mappings (i.e. antenna groups for each layer are formed) are listed with restriction that only one layer is mapped per antenna.
  When a layer is mapped to multiple antennas (i.e. antenna groups), different phase rotation combinations between the antennas within the antenna group are listed as codebook entries.
    Alternatively, a transmission Tx diversity method can be applied between the antennas within the antenna group.

It should be noted that a codebook design containing both PAPR preserving and antenna selection precoding options is not contradictory. PARR preserving precoding is used when UE transmission is power limited, whereas precoding with antenna selection (and, thus, power boosting of remaining transmit antennas) may be used when UE transmission is not power limited.

The codebook may be designed to contain PAPR preserving precoding matrices. Nevertheless, codebook can also contain precoding matrices that do not preserve PAPR.

When looking on the specific codebook designs, it should be appreciated that embodiments of the invention may be used with transmission ranks 1, 2, and 3. Rank 4 is not considered in following. A rank 4 codebook may be provided, using known techniques. Rank can be regarded as the number of different transmit streams.

In the case that pilot signals are typically precoded and the codebook contains entries with a Tx diversity method requiring an antenna specific pilot, two pilot sequences need to be allocated to the UE. The second pilot sequence is used only when Tx diversity is used.

Rank 1

The values in the tables represent the amplitude and phase when a layer X is mapped to antenna Y.

Antennas are grouped into 2 groups with 2 antennas per group. After that, precoding vectors with QPSK rotation combinations between antennas within antenna groups are formed. Additionally, precoding vectors for antenna group selection are included. In the case of antenna group selection, there can be either phase rotation, e.g., BPSK (binary shift keying, between the transmitting antennas, or simply Tx diversity, e.g., Space-Time Block-Coding STBC. The benefit of using Tx diversity is that it allows for more compact (smaller) codebook design. Such codebook design results in 22 or 16 precoding matrix indices if BPSK or STBC is used. An example of resulting codebook options are shown in FIG. 2. There are three tables shown. The first table is where STBC is used and the second table is where BPSK is used. In the third table, the codebook is designed by taking the spatial correlation, that is the polarization or position of antennas into account. In the codebook design, precoding vectors with antenna selection elements are designed so that antennas with high spatial correlation, that is the same polarization direction or adjacent antenna positions can be selected. Thus, only a subset of possible antenna selection combinations is included in the codebook, in one embodiment of the invention.

In the example shown 3-PSK rotation between the selected antennas is applied (in PMIs where antenna selection is presented). It should be noted that also other phase rotation constellations can be used, based, e.g., on QPSK or 8-PSK rotations.

In one alternative embodiment of the invention, entries 11-16 (i.e. antenna selection entries) are taken from table 3, and entries 1-10 are selected from Householder precoding vectors used, e.g. in the 3GPP LTE Release 8 DL 4Tx antenna codebook.

In column 1, the precoding matrix indicator is listed. These indicators are from 1 to 22. The tables lists for each of the four antennas the required rotation or Tx diversity.

The zeros indicate that the associated antenna has not been used for transmission. Rather the transmission power (which may be kept constant for UE) is concentrated on the antennas having favorable channels.

In both of the tables, the first 10 entries show that each of the antenna has a rotation of 0.5, −0.5, 0.5j and −0.5j.

The combinations represent antenna pairing and phase rotation between antenna pairs. For example with table 1, PMIs 1 to-4 represent the following antenna grouping: antenna group number 1 comprises antennas 1 and 2 and antenna group number 2 comprises antennas 3 and 4, with QPSK rotation between groups. Thus antennas 3 and 4 have same phase in these rows, since they belong to the same antenna group. In PMIs 5 to 8, the antenna groups are antennas 1 and 3 and antennas 2 and 4, respectively.

As can be seen, the antennas can be regarded as being two pairs, with each pair being allocated the same rotation. (This is the case for the first 10 entries).

For the first of the tables, the $11^{th}$ to $16^{th}$ entries have STBC on two out of the four antennas. This is so when the UE is not at, for example, a cell edge, it may have power headroom on power amplifiers. Then it may be better to concentrate transmission power on good antennas.

In the second of the tables, there are 12 entries where there is rotation provided for only two of the antennas. One rotation value is always 0.5 in this example. In one embodiment, it an aim to normalize the total transmission power to 1 ($4\times0.5^2=1$). However the absolute value may be varied. In one embodiment, considerations for the phase and the relation of amplitudes may be more important. The other rotation value is −0.5 or 0.5.

As an example, the precoding vector that is expected to maximise the SINR (signal to interference noise ratio) at the output of equalizer in the base station receiver is selected. This can be estimated based on existing channel estimates obtained from a sounding reference signal.

As mentioned, the absolute values in the table may be changed. The amplitude may be the same for all antennas in a given precoding vector, and that amplitudes may be increased when only two transmit antennas out of the four are used so that the same power is distributed between two instead of four antenna.

Rank 2

Antennas are grouped into 2 groups with 2 antennas per group, with each antenna group mapped to one layer or data-stream. After that, precoding vectors with phase rotation, e.g. BPSK (Binary phase shift keying), combinations between the antennas within each antenna groups are formed. Alternatively, there can be Tx diversity, e.g., Space-Time Block-Coding between the antennas mapped to the same layer/antenna group. Such codebook design results in 12 or 3 precoding matrix indices, depending if on BPSK or if STBC is used. The resulting codebook options are shown in FIG. 3.

The benefit of using Tx diversity is that it allows for more compact (smaller) codebook design.

The first table of FIG. 3 is the BPSK codebook design and the second table is the STBC codebook design. As with FIG. 2, the first column represents the precoder matrix indicator. The second column indicates the antenna number. The third column represent layer 1 and the fourth column, layer 2. As can be seen, two of the four antennas are allocated to each of the two layers. Different precoder matrix indicators have different ones of the first to fourth antennas allocated to each of the first and second data streams or layers.

The values assigned to each antenna in the first table are 0.5 and −0.5. With BPSK elements and two layers, there are 12 options. There is no need to have phase rotation between antennas that are mapped to different layers, in some embodiments of the invention.

The values in the table relate to the used phase rotation; in here, the BPSK constellation is used (to keep the codebook size reasonable). Alternatively, the QPSK constellation could be used with the associated values in the table which may also include 0.5j and −0.5j.

In the second table, there are three options given where the antenna each have STBC are applied thereto but different ones of the antennas are assigned to the respective layers.

Rank 3

When transport block-to-layer mapping from LTE Rel'8 DL is assumed, transport block #1 is mapped to layer #1, and transport block #2 is mapped to layers #2 & #3. To ensure that each transport block is transmitted from multiple antennas, layer #1 mapped to 2 antennas whereas layer #2 and 3 are mapped to a single antenna each. Thus each codeword or transport block is mapped to 2 transmit antennas. The precoding codebook contains 6 different layer-to-antenna mappings and applies BPSK rotation or Tx diversity (e.g. STBC) between the antennas used by layer #1. Such a codebook design results in 12 or 6 precoding matrix indices, depending on if BPSK or STBC is used. The resulting codebook options are shown in FIG. 3.

In FIG. 4, the first table applies BPSK rotation and the second table applies STBC. The first column is the PMI and the second column lists the antenna number. The next columns are for the first to third layers. In each table, layer 1 has two antennas assigned to it, whilst layers 2 and 3 each have a single antenna assigned to them. The last columns indicate which ones.

In the first of the tables, the values of 0.5 and −0.5 can be assigned. In the second table, STBC or the value 0.5 can be applied. In rank 3, layer 1 uses two antennas. Since the same data is transmitted from two antennas, STBC is applied over the antennas mapped to layer 1. However, layer 2 and 3 use single antenna each, and thus, different data is sent from these antennas. Thus, STBC is not applied.

Some embodiments of the invention may have one or more of the following advantages:

Single carrier properties are maintained which is suitable for LTE-Advanced UL.

Codebook size can be kept small which means that there is a small signalling overhead in DL—

The antenna pairing is useful in keeping the codebook size small. The antenna pairing reduces the number of combinations for phase rotations. Further by limiting antenna pairs to contain antennas with significant spatial correlation, e.g., the same polarization direction or adjacent antenna positions, the codebook can be kept small. Finally, there is the use of transmit diversity which again assists in keeping the codebook small.

Figure 5:
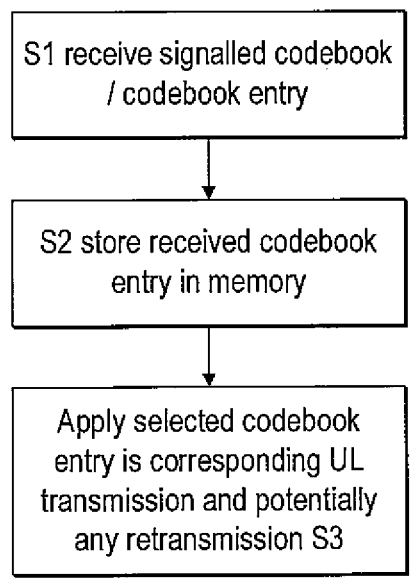
FIG. 5 shows a flowchart of steps taken at the mobile station.

Reference is made to FIG. 5 which shows a flow chart embodying the present invention. This is carried out by the user equipment. Additionally layer mapping (i.e. how transport blocks (code words) are mapped to spatial layers is performed. This may be performed in the UE, corresponding to layer de-mapping in the base station In S1, a codebook is received, or information identifying the codebook. Information identifying one of the entries of the codebook is also received.

In S2, the received information is stored in the memory 207.

In S3, the data stream(s) are preceded in accordance with the information of selected entry. The preceded data streams are then transmitted by the respective antennas. If necessary the selected precoding may be used in any necessary retransmission.

Figure 6:
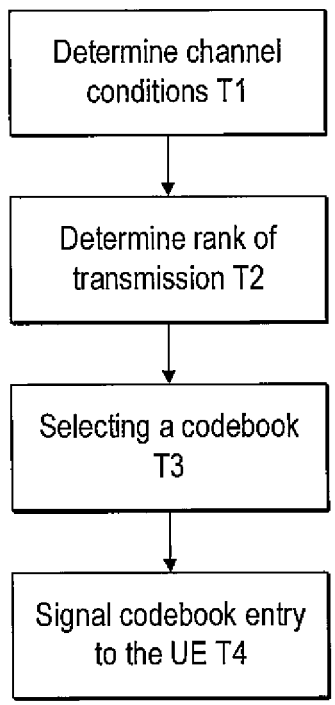
FIG. 6 shows a flowchart of steps taken at the base station

In this regard, reference is made to FIG. 6 which shows steps which may be carried out by the base station.

In T1, the base station is arranged to determine the channel conditions. Preferably, the instantaneous channel conditions are determined. The channel is the channel between the user equipment and the base station.

A determination is made as to the rank of the communication—T2. In other words the number of data streams which are to be transmitted at the same time is determined. In the embodiment discussed, the number of data streams can be up to m where m is the number of antenna which the UE has.

In the next step T3, the base station selects a codebook based on rank and a codebook entry based on the channel conditions and/or the nature of the data streams. Preferably the codebook entry is selected based an the instantaneous channel conditions.

In T4, the selected codebook entry and codebook is sent to the user equipment. Alternatively, information identifying the codebook may be sent, with the codebook entry.

In alternative embodiments of the invention, at the receiver side, for example, in the case that demodulation reference signals are not precoded, the processor 105 of the BTS receiver needs to calculate the effective channel by combining the selected precoding matrix with channel estimates Embodiments of the invention may be used with fewer antennas than four or more than four antennas.

It is noted that whilst embodiments may have been described in relation to user equipment or mobile devices such as mobile terminals, embodiments of the present invention may be applicable to any other suitable type of apparatus suitable for communication via access systems. A mobile device may be configured to enable use of different access technologies, for example, based on an appropriate multi-radio implementation.

It is also noted that although certain embodiments may have been described above by way of example with reference to the exemplifying architectures of certain mobile networks and a wireless local area network, embodiments may be applied to any other suitable forms of communication systems than those illustrated and described herein. It is also noted that the term access system may be understood to refer to any access system configured for enabling wireless communication for user accessing applications.

The above described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility may be to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the inventions may be practiced in various components such as integrated circuit modules. The design of integrated circuits can be by and large a highly automated process. Complex and powerful software tools may be available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. may automatically route conductors and locate components on a semiconductor chip using well established rules of design as well as libraries of pre-stored design modules. Once the design for a semiconductor circuit may have been completed, the resultant design, in a standardized electronic format (e.g., Opus, GDSII, or the like) may be transmitted to a semiconductor fabrication facility or "fab" for fabrication.

It is noted herein that while the above describes exemplifying embodiments of the invention, there are several variations and modifications which may be made to the disclosed solution without departing from the scope of the present invention as defined in the appended claims.

The invention claimed is:

1. A method comprising:
using a precoding code book for controlling transmissions from four antennas of a device, said code book consisting of a plurality of entries comprising different antenna pair combination whereby one or two antenna pairs are selected for transmission, wherein each of said entries are such that only a single layer is mapped to each antenna that is selected for transmission.

2. The method as claimed in claim 1, comprising providing a plurality of precoding books, each of said precoding books being associated with a respective rank.

3. The method as claimed in claim 2, comprising providing four precoding books for ranks 1 to 4.

4. The method as claimed in claim 3, wherein a size of a codebook of one rank is different from a size of a codebook of at least one other rank.

5. The method as claimed in claim 4, wherein a size of a codebook of one rank is bigger than a size of a codebook of a higher rank.

6. The method as claimed in claim 2, comprising determining a rank and selecting one of a plurality of codebooks in dependence on the determined rank.

7. The method as claimed in claim 6, comprising determining the rank is one and selecting an associated codebook which allocates said antenna to the same layer.

8. The method as claimed in claim 6, comprising determining the rank is two and selecting an associated codebook which allocated two antenna to each layer.

9. The method as claimed in claim 6, comprising determining that the rank is three and selecting an associated codebook which allocates two antenna to one layer and a single antenna to each of two other layers.

10. The method as claimed in claim 1, wherein a plurality of entries of at least one precoding book is arranged to divide said antennas into at least one pair, with at least one pair having the same phase rotation.

11. The method as claimed in claim 1, wherein a plurality of entries of at least precoding book is arranged to divide said antenna into at least one pair, with different antenna in at least one pair having different phase rotation.

12. The method as claimed in claim 1, wherein at least a plurality of different entries of at least one precoding book provide different respective phase rotation combinations.

13. The method as claimed in claim 1, wherein a plurality of entries of at least one precoding book is arranged to only use one pair of said antennas.

14. The method as claimed in claim 1, comprising controlling power with which an antenna transmits in accordance with a number of antenna which are transmitting at the same time.

15. The method as claimed in claim 1, wherein at least one antenna pair is arranged in accordance with spatial correlation properties of said antennas.

16. The method as claimed in claim 15, wherein said different spatial correlation properties comprise at least one of antenna polarization and antenna position.

17. The method as claimed in claim 1, wherein at least one entry in said codebook provides transmit diversity applied over two antennas of a selected antenna pair.

18. The method as claimed in claim 1, comprising transmitting at least one transport block from a plurality of antenna.

19. A non-transitory computer readable memory storing computer program software which when loaded to a computer and executed by one or more processors causes a communications device to perform the steps of claim 1.

20. Apparatus comprising:
a processor configured to use a precoding code book for controlling transmissions from four antennas of a device, said code book consisting of a plurality of entries comprising different antenna pair combinations whereby one or two antenna pairs are selected for transmission, wherein each of said entries are such that only a single layer is mapped to each antenna that is selected for transmission.

21. The apparatus as claimed in claim 20, wherein said processor is configured to control power with which an antenna transmits in accordance with a number of antenna which are transmitting at the same time.

22. The apparatus as claimed in claim 20, wherein said processor is configured to control the transmission of at least one transport block from a plurality of antenna and further configured to control power with which an antenna transmits in accordance with a number of antenna which are transmitting at the same time.

23. The apparatus as claimed in claim 20, comprising a memory storing a plurality of precoding books, each of said precoding books being associated with a respective rank.

24. Apparatus as claimed in claim 23, wherein four precoding books for ranks 1 to 4 are provided.

25. The apparatus as claimed in claim 23, wherein a size of a codebook of one rank is different from a size of a codebook of at least one other rank.

26. The apparatus as claimed in claim 25, wherein a size of a codebook of one rank is bigger than a size of a codebook of a higher rank.

27. The apparatus as claimed in claim 20, wherein a plurality of entries of at least one precoding book is arranged to divide said antennas into at least one pair, with at least one pair having the same phase rotation.

28. The apparatus as claimed in claim 20, wherein a plurality of entries of at least precoding book is arranged to divide said antenna into at least one pair, with different antenna in at least one pair having different phase rotation.

29. The apparatus as claimed in claim 20, wherein at least a plurality of different entries of at least one precoding book provide different respective phase rotation combinations.

30. The apparatus as claimed in claim 20, wherein a plurality of entries of at least one precoding book is arranged to only use one pair of said antennas.

31. The apparatus as claimed in claim 20, wherein at least one antenna pair entry is arranged in accordance with spatial correlation properties of said antennas.

32. The apparatus as claimed claim 20, wherein said different spatial correlation properties comprise at least one of antenna polarization and antenna position.

33. The apparatus as claimed in claim 20, wherein at least one entry in said codebook provides transmit diversity applied over two antennas of a selected antenna pair.

34. An integrated circuit or chip set comprising an apparatus as claimed in claim 20.

35. A user equipment comprising an apparatus as claimed in claim 20.

36. Apparatus comprising:
a processor configured to select one of a plurality of entries in a precoding code book for controlling transmissions from four antennas of a device, said code book entries comprising different antenna pair combinations whereby one or two antenna pairs are configured to be selected for transmission and each of said entries are such that only a single layer is mapped to each antenna that is selected for transmission.

37. The apparatus as claimed in claim 36, wherein said processor is configured to determine a rank and selecting one of a plurality of codebooks in dependence on the determined rank.

38. The apparatus as claimed in claim 37, wherein said processor is configured, when the rank is determined to be one to select an associated codebook which allocates said antenna to the same layer.

39. The apparatus as claimed in claim 37, wherein said processor is configured, when the rank is determined to be two to select an associated codebook which allocates two antenna to each layer.

40. The apparatus as claimed in claim 38, wherein said processor is configured, when the rank is determined to be three to select an associated codebook which allocates two antenna to one layer and a single antenna to each of two other layers.

41. A base station comprising an apparatus as claimed in claim 36.

* * * * *